United States Patent [19]

Saito et al.

[11] Patent Number: 5,376,985
[45] Date of Patent: Dec. 27, 1994

[54] INPUT SYSTEM FOR PHOTOGRAPHIC CAMERA

[75] Inventors: Tatsuo Saito; Haruo Onozuka, both of Ohmiya, Japan

[73] Assignee: Fuji Photo Optical Co., Ltd., Ohmiya, Japan

[21] Appl. No.: 225,232

[22] Filed: Apr. 8, 1994

Related U.S. Application Data

[63] Continuation of Ser. No. 71,703, Jun. 4, 1993, abandoned.

[30] Foreign Application Priority Data

Jun. 5, 1992 [JP] Japan .................................. 4-171965

[51] Int. Cl.⁵ ............................................. G03B 17/00
[52] U.S. Cl. ............................ 354/289.12; 340/825.11
[58] Field of Search ....................... 354/289.1-289.12, 354/412, 486; 340/825.1, 825.11

[56] References Cited

U.S. PATENT DOCUMENTS 3,974,478  8/1976  Griffith et al. .................... 340/825.1
4,994,845 12/1991  Naruse et al. ......................... 354/415

OTHER PUBLICATIONS

U.S. application Ser. No. 08/071,706, filed Jun. 4, 1993, entitled Film Transporting System for Photographic Camera.
U.S. application Ser. No. 08/073,171, filed Jun. 8, 1993, entitled Film Transporting System for Photographic Camera.
U.S. application Ser. No. 08/081,526, filed Jun. 23, 1993 entitled Source Voltage Monitor for a Photographic Camera.
U.S. application Ser. No. 08/089,883, filed Jul. 12, 1993 entitled Display Arrangement for Charging Condition in Strobing Circuit of Photographic Camera with Built--in Strobe-Flash Device.

Primary Examiner—David M. Gray
Attorney, Agent, or Firm—Price, Heneveld, Cooper, DeWitt & Litton

[57] ABSTRACT

An input system for photographic cameras is provided with a plurality of input switches. The input system includes a matrix input circuit having a plurality of inputs corresponding to a plurality of outputs. A state detector scans key signals output from matrix input circuit at predetermined time intervals and detects states of respective switches provided in the camera so that the camera may operate according to these states. The time interval at which the key scan signals are output is adjustable depending on a state of a main switch. Specifically, the time interval may be relatively long when the main switch is in an OFF state and relatively short when the main switch is in an ON state. More specifically, when the main switch is in the ON state, the time interval of key scan should be adjusted relatively short so that the camera may rapidly operate in response to the states of the respective switches because the camera is ready for photographing in this state of the main switch. When the main switch is in the OFF state, on the other hand, the time interval of the key scan may be relatively long to suppress a consumption of a source battery, because the camera is not ready for photographing in this state of the main switch and it is unnecessary for the camera to operate rapidly.

11 Claims, 5 Drawing Sheets

INPUT SYSTEM FOR PHOTOGRAPHIC CAMERA

This is a continuation of copending application Ser. No. 08/071,703 filed on Jun. 4, 1993, now abandoned.

BACKGROUND OF THE INVENTION

1. Technical Field

This invention relates to an input system for a photographic camera provided with a plurality of input switches such as photographing mode switches, an objective zooming switch and a film existence detecting switch.

2. Prior Art

There has been popularized the handy photographic camera containing therein a CPU adapted to control various functions of the camera so that the user may easily and reliably take a photograph without requiring skill and experience. Such prior art cameras typically employ, as an input system, a so-called matrix input circuit having a plurality of inputs in association with a plurality of outputs.

In such a matrix input circuit, in order to detect the particular one of switches that has been turned ON, the state detector means cooperates with key scan signals provided from the respective key scan signal output terminals at different predetermined intervals for the respective output terminals.

SUMMARY OF THE INVENTION

With such input systems of prior art, the time intervals at which the key scan signals are output to detect states of the respective switches are constant no matter whether the camera is in a state ready for photographing. It should be understood that several switches, such as a rear cover switch, a forced film rewind switch and a film existence detecting switch must be scanned even when the camera is not in the state ready for photographing, because these switches are operated by the user whether the camera is in the state ready for photographing. However, the modern CPU is relatively low in power consumption and adapted to be energized even when said detection is not intended.

The earlier CPU built in the conventional camera was of the type requiring a large power consumption and, to save the power consumption, the CPU was adapted to be energized only when the switch state is detected.

Generally, it is required for the camera to operate as rapidly as possible in response to a particular switch which has been turned ON. To meet this requirement, a time interval for scanning to detect the ON state of the switch may be shortened and thereby the delay from operation of this switch to the responsive operation of the camera is shortened. However, during such detection of the ON state of the switch, a relatively large amount of power is consumed from the source battery. On the other hand, such rapid response is not required for various kinds of operations performed by the camera when the camera is not in the state ready for photographing, such as the forced film rewinding. Therefore, scanning at the same time interval when the camera is not in the state ready for photographing as when the camera is in the state ready for photographing would result in wasteful power consumption. At any rate, the input system of the prior art employing constant time intervals at which the key scan signals are output to detect that the selected switch is in an ON state is disadvantageous, since a consumption of the source battery will be unacceptably accelerated if the scanning time intervals are shortened to achieve a rapid response of camera operation and no instantaneous operation in response to input of each switch can be expected if the scanning time intervals are extended in order to suppress consumption of the source battery.

Accordingly, it is a principle object of the invention to provide an input system for a photographic camera that allows the camera to instantaneously operate in response to operation of a selected switch during actual photographing and saving a consumption of the source battery for operation of the camera having no direct participation in photographing.

The object set forth above is achieved, in accordance with the invention, by an input system for a photographic camera. The input system comprises a matrix input circuit having a plurality of inputs corresponding to a plurality of outputs and state detector means adapted to scan key scan signals output at predetermined time intervals from key scan signal output terminals of said matrix input circuit and to detect states of respective switches. The camera operates depending on the detected states. The time intervals at which the key scan signals are output are changed depending on a state of a main switch. Additionally, the time intervals at which the key scan signals are output are adjusted to be shorter in a state of the camera ready for photographing with a main switch turned ON than in a state of the camera unready for photographing with the main switch turned OFF.

Preferably, a group of switches having their states detected by said state detector means at least include said main switch used to change over a state of the camera between operative and non-operative states, a self-switch preparing the camera for self-timer photographing, a film existence detecting switch used to detect whether the camera contains a film roll, a photographing mode switch used to change over the photographing modes, a wide-angle zoom switch to move the object to a position for wide-angle photographing, a forced film rewind switch used to force film rewinding, a telephoto zoom switch to move the objective to a position for telephotographing, a first stage release switch used to initiate photometric and range finding operation, a second stage release switch used for camera release, and a rear cover switch adapted to be turned ON-OFF upon opening and closure of said rear cover, respectively.

Preferably, a state of the main switch is detected simultaneously when states of the respective switches are detected by said state detector means but the state of said main switch is not detected during detection of said film existence detecting switch, forced film rewind switch and rear cover switch.

DETAILED DESCRIPTION OF THE PREFERRED EMBODIMENTS

Figure 2:
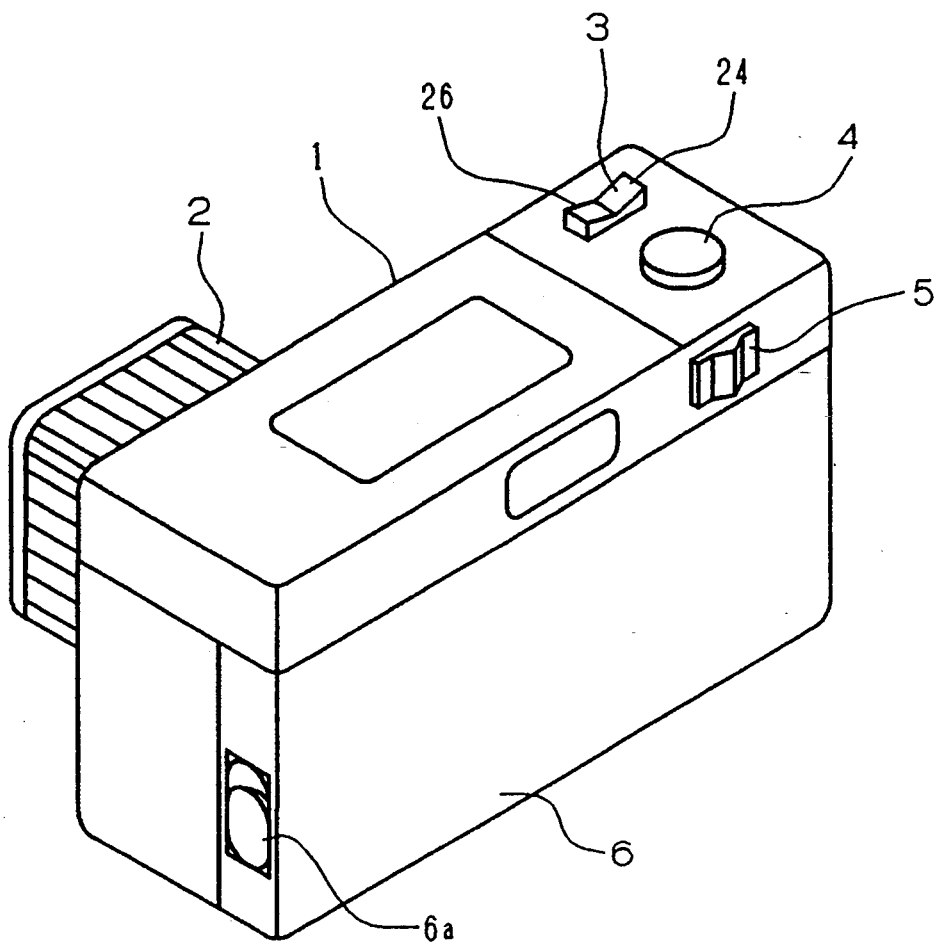
FIG. 2 is a back perspective view showing the camera as viewed from behind.

FIG. 2 is a perspective view showing the external appearance of the camera as viewed from behind and, as shown, there is retractably provided a movable lens barrel 2 on the front side of a camera body 1. An objective (not shown) is held by movable lens barrel 2 and a focal distance thereof varies depending on a movement of lens barrel 2 so as to define a zoom system. There is provided a zoom switch 3 on the top of the camera to move lens barrel 2. Zoom switch 3 is of see-saw type. Specifically, lens barrel 2 retracts as zoom switch 3 is turned ON by depressing one end (defining a wide-angle zoom switch 24) and moves forward as zoom switch 3 is turned ON by depressing the other end (defining a telephoto zoom switch 26). It should be understood that zoom switch 3 is also of self-restoring type adapted to restore the initial state upon release of the user's finger. Behind zoom switch 3 there is provided a release button 4 adapted to be depressed by a first half of a stroke to turn a first stage release switch (SP1) and to be further depressed by a second half of stroke to turn a second stage release switch (SP2). Camera body 1 is further provided on the rear side adjacent the upper end thereof, with a main switch 5 and, when main switch 5 is turned ON, a barrier which normally covers the objective is opened, movable lens barrel 2 moves from its retracted position to the wide-angle photographing position and a built-in strobe (not shown) is charged in order to bring the camera to a state ready for photographing.

Though not shown, camera body 1 includes, on appropriate locations thereof, in addition to release button 4 and main switch 5, a self-switch (SSELF) destined to be turned ON for self timer photographing, a forced film rewind switch (SMR) used to forcibly rewind a film roll even if this film roll has several frames remaining unused, and a photographing mode switch (SMODE) used to change over the photographing mode, for example, among normal photographing mode, panorama photographing mode and strobe photographing mode. A rear cover 6 is provided on one sidewall thereof with a rear cover opening lever 6a so that lever 6a may be operated to open rear cover 6 and thereby to turn a rear cover switch (SB) (not shown) ON. Furthermore, a cartridge chamber is provided with a film existence detecting switch (SF) (not shown) used to detect whether the cartridge chamber contains a film roll.

Figure 3:
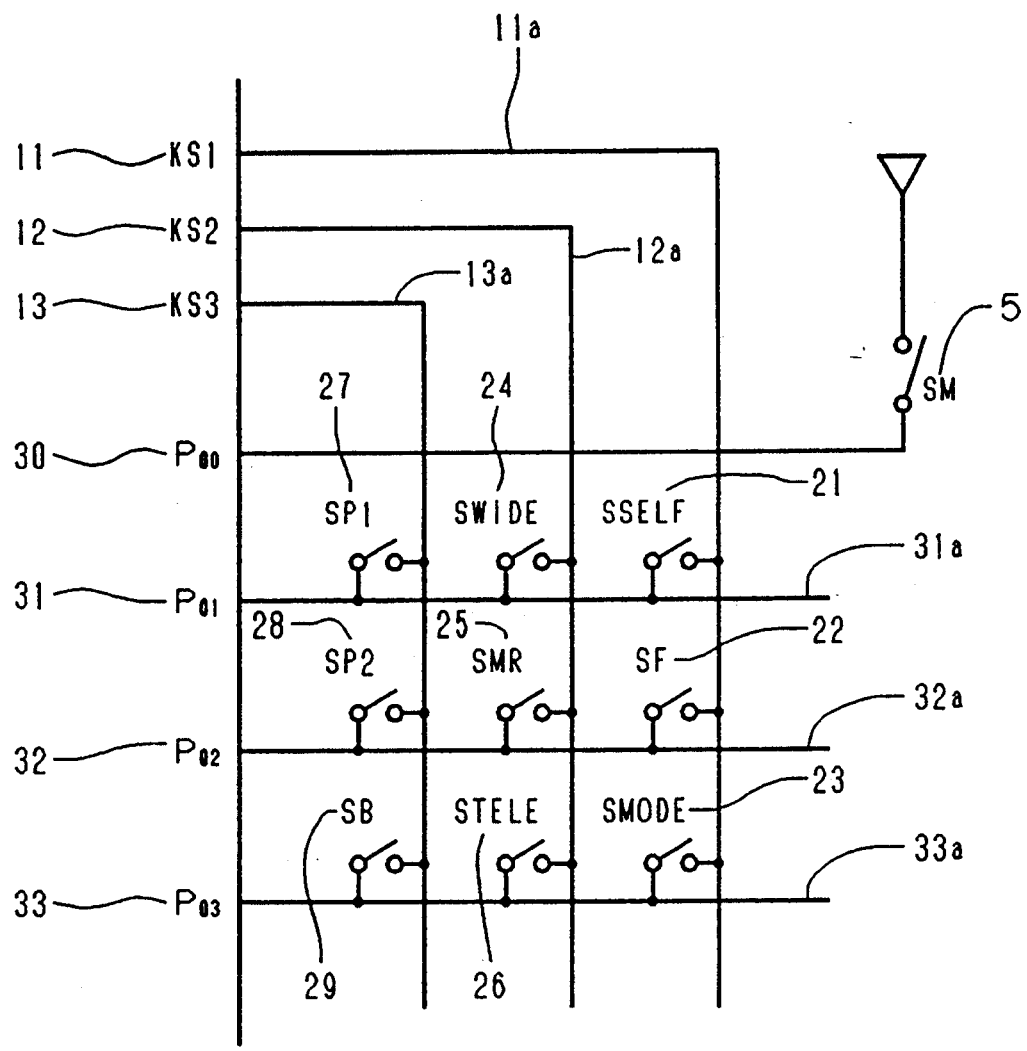
FIG. 3 is a circuit diagram of the matrix input circuit.

The respective switches, as mentioned above, are wired in the matrix input circuit, as shown by FIG. 3. Specifically, respective fixed contacts of the self-switch (SSELF) 21, the film existence detecting switch (SF) 22 and the photographing mode switch (SMODE) 23 are electrically connected to a line 11a which is, in turn, electrically connected to a first key scan signal output terminal (KS1) 11; respective fixed contacts of the wide-angle zoom switch (SWIDE) 24 adapted to be turned ON to move the objective to the position for wide-angle photographing under activation of zoom switch 3, the forced film rewind switch (SMR) 25 adapted to be turned ON to forcibly rewind the film roll loaded in the camera and the telephoto zoom switch (STELE) 26 adapted to be turned ON to move the objective to a position for telephotographing are electrically connected to a line 12a which is, in turn, electrically connected to a second scan signal output terminal (KS2) 12; and respective fixed contacts of the first stage release switch (SP1) 27, the second stage release switch (SP2) 28 and the rear cover switch (SB) 29 are electrically connected to a line 13a which is, in turn, electrically connected to a third key scan signal output terminal (KS3) 13. On the other hand, said main switch (SM) 5 is electrically connected to a switch input terminal ($P_{00}$); respective movable contacts of said (SSELF) 21, (SWIDE) 24 and (SP1) 27 are electrically connected to a line 31a which is, in turn, electrically connected to a first input terminal ($P_{01}$); respective movable contacts of said (SF) 22, (SMR) 25 and (SP2) 28 switches are electrically connected to a line 32a which is, in turn, electrically connected to a second switch input terminal ($P_{02}$); and respective movable contacts of said (SMODE) 23, (STELE) 26 and (SB) 29 switches are electrically connected to a line 33a which is, in turn, electrically connected to a third switch input terminal ($P_{03}$) 33.

Figure 1:
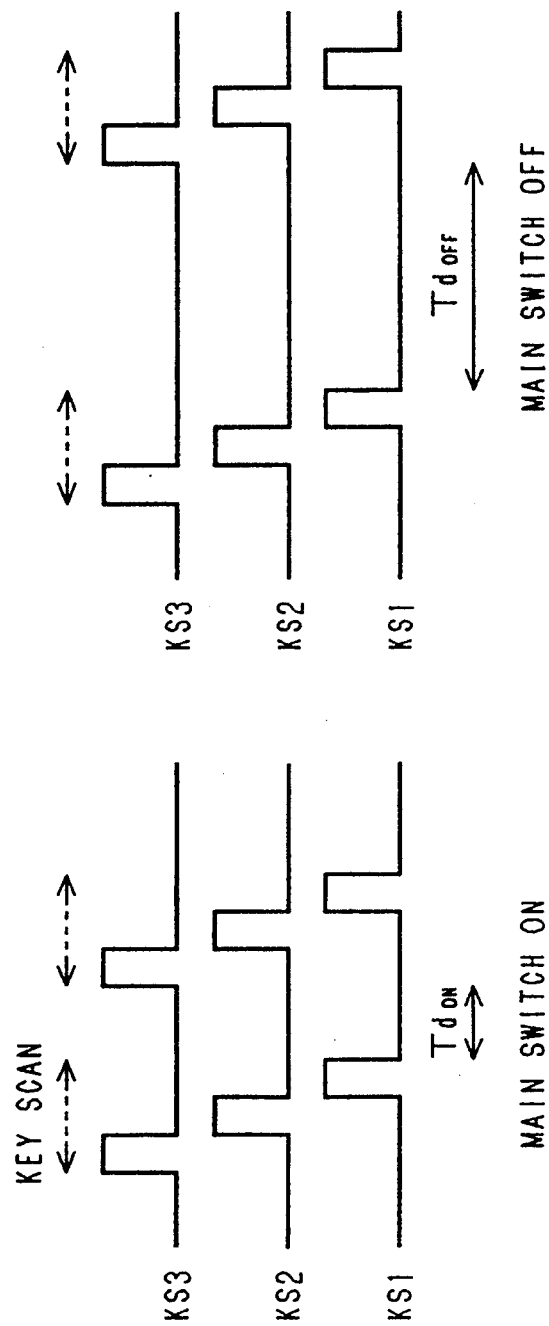
FIG. 1a and 1b are time charts illustrating a key scan signal output in the input system of the invention a) when the main switch is in the ON state, and b) when the main switch is in the OFF state.

Key scan signals are output from key scan signal output terminals (KS1) 11, (KS2) 12 and (KS3) 13, respectively, as shown in this order from bottom by FIG. 1, in which FIG. 1(a) shows the signals appearing when main switch 5 is in the ON state and FIG. 1(b) shows the signals appearing when main switch 5 is in the OFF state. In FIG. 1, Td represents a time interval for output of the key scan signal, $Td_{on}$ represents the time interval when (SM) 5 is in the ON state, $Td_{OFF}$ represents the time interval when (SM) 5 is in the OFF state, and assumed, for example, $TD_{ON}=30$ msec. and $Td_{OFF}=250$ msec., $Td_{ON}<Td_{OFF}$. While these key scan signals are being output, the state detector means (not shown) detects whether states of the various switches such as (SSELF) 21, (SMR) 25 and (SB) 29 are ON or OFF.

Figure 4:
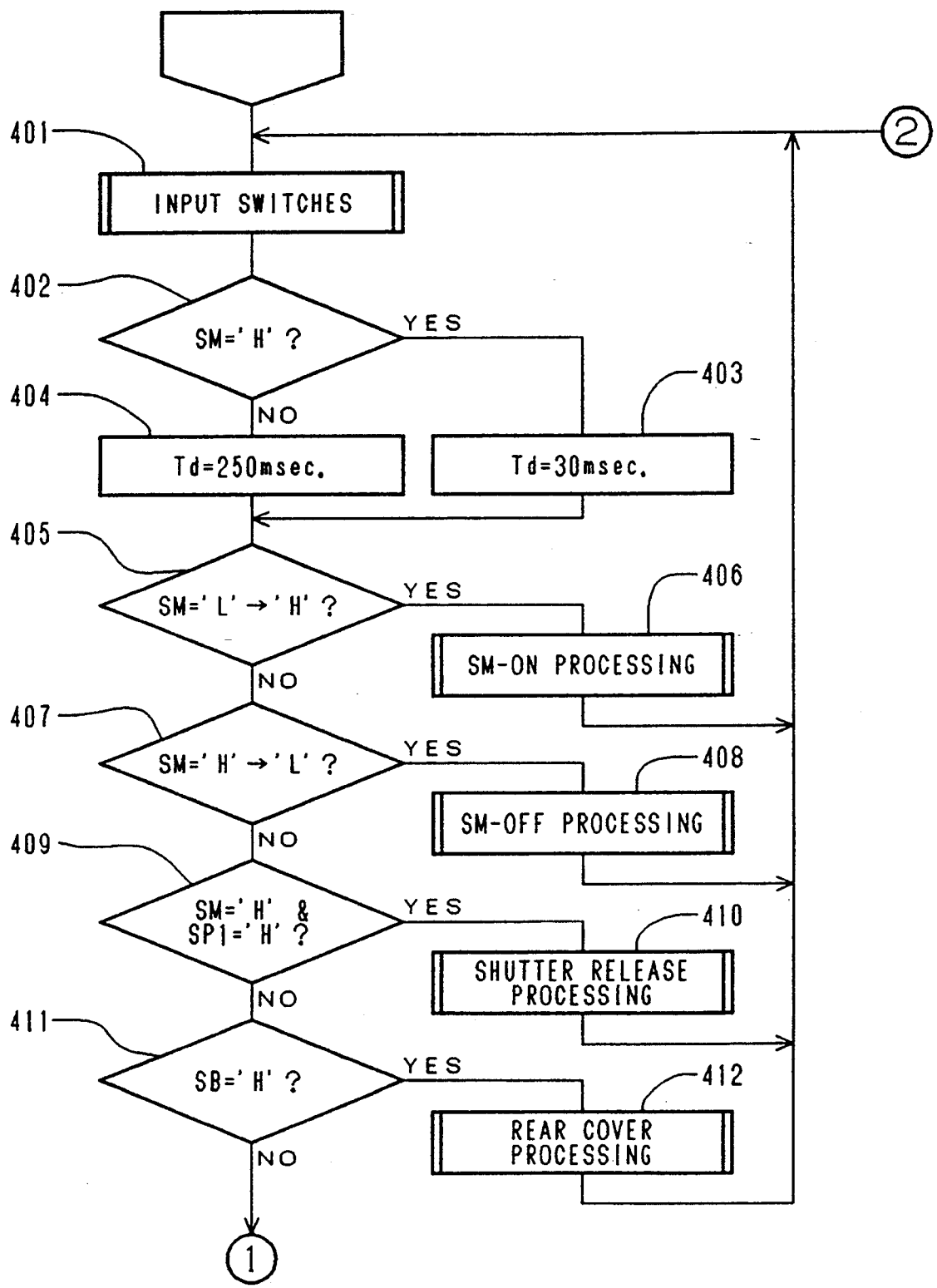
FIG. 4 is a flow chart illustrating a routine for detecting the respective switches built in the camera.
Figure 5:
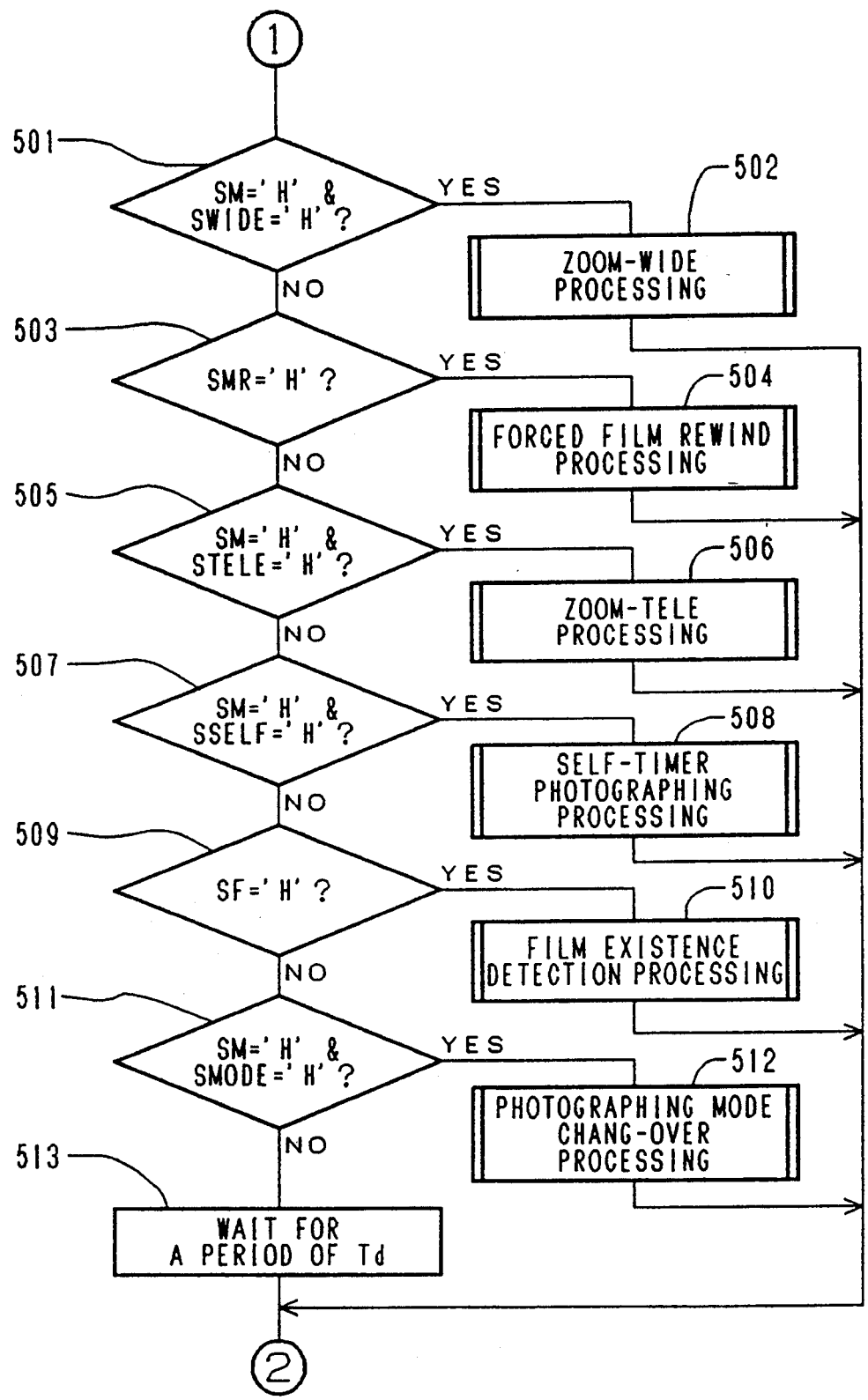
FIG. 5 is a flow chart illustrating the routine for detecting the respective switches.

The input system for the photographic camera constructed according to the teachings of the invention, as described above, operates as will be described with respect to the routine as shown by the flow charts of FIGS. 4 and 5.

With the camera being in a state of switch input processing (step 401), it is determined by the state detector means whether (SM) 5 has been turned ON (SM="H"?) (step 402) and, if YES, the routine proceeds to step 403 to set the time interval Td for the key scan signal to 30 msec. (=$Td_{ON}$) and if NO, the routine proceeds to step 404 to set Td−250 msec. (=$Td_{OFF}$). Then scanning by (KS3) 13 is started and the routine proceeds to step 405 on which the state detector means determines whether the state of (SM) 5 has changed from OFF to ON (SM="L" to "H" ?). If YES, the routine proceeds to step 406 to run processing associated with the ON state of (SM) 5 such as opening of the barrier and initiation of the strobe circuit charging, and then the routine returns to step 401. If conclusion of step 405 is NO, the routine proceeds to step 407 wherein the state detector means determines whether the state of (SM) 5 has changed from ON to OFF (SM="H" to "L"?). If YES, the routine proceeds to step 408 to run processing associated with OFF state of (SM) 5, for example, closure of the barrier and termination of the strobe circuit charging, and then the routine returns to step 401. If conclusion of step 407 is NO, the routine proceeds to step 409.

At step 409, (SM) 5 has been turned on (SM="H") and it is determined by the state detector means whether said first stage release switch (SP1) 27 has been turned ON (SP1="H"). If YES, the shutter release processing is run (step 401) and then the routine returns to step 401. The shutter release processing includes object luminance measuring and photographic range finding which are run by depressing release button 4 by a first half stroke prior to the camera release. Release button 4 is further depressed and, if the state detector means ascertains that the second stage release switch (SP2) 28 has been turned ON, the shutter will be released.

If the conclusion of step 409 is NO, the routine proceeds to step 411 at which the state detector means determines whether the rear cover switch (SB) 29 has been turned ON (SB="H"). The rear cover switch (SB) 29 is turned ON upon opening of rear cover 6 no matter whether main switch 5 is in the ON state, and therefore, step 411 does not determine the state of main switch 5. If (SB) 29 is in the ON state, it is indicated that rear cover 6 is open and, accordingly, the routine proceeds to step 412 to run the rear cover processing such as resetting of a film count display. Then the routine returns to step 401. If the conclusion of step 411 is NO, scanning by (KS3) 13 is terminated and scanning by (KS2) 12 is started. Thereafter, the routine proceeds to step 501.

In step 501, (SM) 5 is turned ON and the state detector means determines whether the wide-angle zoom switch (SWIDE) 24 of zoom switch 3 is in the ON state (SWIDE="H"). If YES, the routine proceeds to step 502 to run the ZOOM-WIDE processing, i.e., to move the objective to the position for wide-angle photographing and returns to step 401.

If the conclusion of step 501 is NO, the routine proceeds to step 503 in which it is determined by the state detector means whether the forced film rewind switch (SMR) 25 is in the ON state (SMR="H"). Since this switch (SMR) 25 is operated no matter whether main switch 5 is in the ON state, step 503 does not determine the state of (SM) 5. If the conclusion of step 501 is YES, the routine proceeds to step 504 to forcibly rewind the film roll loaded in the camera even if this film roll has several frames remaining unused and then the routine returns to step 401.

If the conclusion of step 503 is NO, the routine proceeds to step 505 in which (SM) 5 is turned ON and it is determined by the state detector means whether said telephoto zoom switch (STELE) 26 is in the ON state (STELE="H"). If YES, the routine proceeds to step 506 to run the ZOOM-TELE processing, i.e., to move the objective to the position for telephotographing and then returns to step 401.

If the conclusion of step 505 is NO, scanning by (KS2) 12 is terminated and scanning by (KS1) 11 is started. Then the routine proceeds to step 507 on which (SM) 5 is turned ON and it is determined whether said self switch (SSELF) 21 is in the ON state (SSELF="H"). If YES, the routine proceeds to step 508 to rim the processing associated with self-time photographing, e.g., to set a timer for self timer photographing and to release the shutter after a predetermined time has elapsed. The routine then returns to step 401.

If the conclusion of step 507 is NO, the routine proceeds to step 509 in which it is determined by the state detector means whether the film existence detecting switch (SF) 22 is in the ON state (SF="H"). Since (SF) 22 is operated no matter whether main switch 5 is in the ON state, step 509 does not determine the state of (SM) 5. If the conclusion of step 509 is YES, i.e., the camera contains a film roll, the routine proceeds to step 510 to run the processing associated with film existence detection, e.g., to realize the sensitivity of the film and advance the film leader for the initial film setting in preparation to the release for the photographing. The routine then returns to step 401.

If the conclusion of step 509 is NO, the routine proceeds to step 511 in which (SM) 5 is turned ON and, it is determined by the state detector means whether the photographing mode switch (SMODE) 23 is in the ON state (SMODE="H"). If yes, the routine proceeds to step 512 to run the photographing mode change over processing and then returns to step 401.

If the conclusion of step 511 is NO, scanning by (KS1) 11 is terminated and the routine proceeds to step 513 to await the next key scan signal for a period of Td, which depends on the conclusion of step 402. Specifically, Td=30 msec. (=$Td_{ON}$) with main switch 5 being in the ON state and Td=250 msec. (=$Td_{OFF}$) with main switch 5 in the OFF state. In this manner, the key scanning can be performed at relatively short time intervals to assure rapid operation of the camera when the main switch 5 is in the ON state and, therefore, the camera is ready for photographing but can be performed at relatively long time intervals when main switch 5 is in the OFF state and, therefore, the camera is not ready for photographing such that rapid operation of the camera is not required. Consequently, a power consumption which otherwise would be considerably high even when main switch 5 is in the OFF state can be effectively suppressed.

After waiting time TD has elapsed, the routine returns to step 401 and previously mentioned steps 402 through 513 are repeated.

Effect of the Invention

With the input system of the invention, as will be readily understood from the foregoing description, the time intervals at which the key scan signals are output to detect states of various switches utilizing the matrix input circuit can be adjusted depending on the state of the main switch. Specifically, a relatively short time interval is selected when the main switch is detected to be in the ON state and a relatively long time interval is selected when the main switch is detected to be in the OFF state, so that the camera may respond rapidly to the respective switches in the ON state of the main switch and a consumption of the source battery may be suppressed in the OFF state of the main switch.

Because the time intervals at which the key scan signals are output are controlled depending on the state of the main switch., the other various kinds of processing, such as detection of switches' states, may be performed in the manner common to both states of the main switch without any complicated control.

The step added to prior art routines detects a state of the main switch prior to detecting states of other switches. The time intervals at which the key scan signals are output may thus be changed depending on the detected state of the main switch. Accordingly, the system can be realized with simplified construction at an acceptable cost.

The embodiments of the invention in which an exclusive property or privilege is claimed are defined as follows:

1. An input system for a photographic camera, said input system comprising:

a matrix input circuit having a plurality of inputs corresponding to a plurality of outputs; and state detector means adapted to scan key scanning signals output at predetermined time intervals from key scan signal output terminals of said matrix input circuit and thereby to detect states of respective switches, wherein the camera is operated depending on the state of each switch thus detected; and wherein the time intervals at which said key scan signals are output are changed depending on the state of a main switch.

2. The input system for a photographic camera as defined in claim 1, wherein the time intervals at which the key scan signals are output are adjusted to be shorter in a state of the camera ready for photographing with a main switch turned ON than in a state of the camera unready for photographing with the main switch turned OFF.

3. The input system for a photographic camera as defined in claim 1, wherein a group of switches having their states detected by said state detector means at least include said main switch used to change over the camera between operative and non-operative states, a self-switch allowing the camera to be ready for self-timer photographing, a film existence detecting switch used to detect whether the camera contains a film roll, a photographing mode switch used to change over the photographing modes, a wide-angle zoom switch used to move the objective to the position for wide-angle photographing, a forced film rewind switch used to forcibly rewind the film roll, a telephoto zoom switch used to move the objective to the position for telephotographing, a first stage release switch used to initiate photometric and range finding operation, a second stage release switch used to release the camera and a rear cover switch adapted to be turned ON-OFF upon opening and closure of a rear cover.

4. The input system for a photographic camera as defined in claim 1, wherein the state of the main switch is detected simultaneously when states of the respective switches are detected by said state detector means.

5. The input system for a photographic camera as defined in claim 2, wherein a group of switches having their states detected by said state detector means at least include said main switch used to change over the camera between operative and non-operative states, a self-switch allowing the camera to be ready for self-timer photographing, a film existence detecting switch used to detect whether the camera contains a film roll, a photographing mode switch used to change over the photographing modes, a wide-angle zoom switch used to move the objective to the position for wide-angle photographing, a forced film rewind switch used to forcibly rewind the film roll, a telephoto zoom switch used to move the objective to the position for telephotographing, a first stage release switch used to initiate photometric and range finding operation, a second stage release switch used to release the camera and a rear cover switch adapted to be turned ON-OFF upon opening and closure of a rear cover.

6. The input system for a photographic camera as defined in claim 2, wherein the state of the main switch is detected simultaneously when states of the respective switches are detected by said state detector means.

7. The input system for a photographic camera as defined in claim 3, wherein the state of the main switch is detected simultaneously when states of the respective switches are detected by said state detector means.

8. The input system for a photographic camera as defined in claim 5, wherein the state of the main switch is detected simultaneously when states of the respective switches are detected by said state detector means.

9. The input system for a photographic camera as defined in claim 3, wherein the state of the main switch is not detected when the states of said film existence detecting switch, forced film rewinding switch and rear cover switch are detected.

10. The input system for a photographic camera as defined in claim 7, wherein the state of the main switch is not detected when the states of said film existence detecting switch, forced film rewinding switch and rear cover switch are detected.

11. The input system for a photographic camera as defined in claim 8, wherein the state of the main switch is not detected when the states of said film existence detecting switch, forced film rewinding switch and rear cover switch are detected.

* * * * *